US009274564B2

(12) United States Patent
Chang et al.

(10) Patent No.: US 9,274,564 B2
(45) Date of Patent: Mar. 1, 2016

(54) ANTENNA IN OR BELOW KEYBOARD

(71) Applicant: GOOGLE INC., Mountain View, CA (US)

(72) Inventors: Yuan-Jen Chang, Taipei (TW); Ajay Chandra Venkata Gummalla, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 110 days.

(21) Appl. No.: 14/142,421

(22) Filed: Dec. 27, 2013

(65) Prior Publication Data

US 2015/0146357 A1    May 28, 2015

(51) Int. Cl.
*G06F 1/16* (2006.01)

(52) U.S. Cl.
CPC .......... *G06F 1/1662* (2013.01); *Y10T 29/49002* (2015.01)

(58) Field of Classification Search
CPC .................................................... G06F 1/1662
USPC ..................................................... 361/679.09
See application file for complete search history.

(56) References Cited

U.S. PATENT DOCUMENTS

| | | | | |
|---|---|---|---|---|
| 6,016,126 A | * | 1/2000 | Holshouser | H01Q 1/243 343/702 |
| 6,157,344 A | * | 12/2000 | Bateman et al. | 343/700 MS |
| 7,388,547 B2 | * | 6/2008 | Lee | H01Q 1/243 343/700 MS |
| 2006/0076405 A1 | * | 4/2006 | Takimoto | G06K 7/0008 235/382 |
| 2007/0209920 A1 | | 9/2007 | Yanagi et al. | |
| 2011/0156966 A1 | * | 6/2011 | Taniguchi et al. | 343/702 |
| 2012/0062441 A1 | * | 3/2012 | Peiker | 343/912 |
| 2012/0206307 A1 | * | 8/2012 | Orihara | G06K 19/0773 343/722 |
| 2012/0212417 A1 | | 8/2012 | Chen | |
| 2013/0169398 A1 | * | 7/2013 | Sugita | H01Q 1/243 336/179 |
| 2013/0293430 A1 | * | 11/2013 | Henty | H01F 38/14 343/720 |
| 2014/0203988 A1 | * | 7/2014 | Yang | H01Q 7/00 343/842 |

FOREIGN PATENT DOCUMENTS

| | | |
|---|---|---|
| EP | 1748515 A1 | 1/2007 |
| WO | 2013/095428 A1 | 6/2013 |
| WO | 2013/154552 A1 | 10/2013 |

OTHER PUBLICATIONS

Extended European Search Report Received for European Patent Application No. 14194763.0, mailed on Apr. 24, 2015, 6 pages.

* cited by examiner

*Primary Examiner* — Tuan T Dinh
*Assistant Examiner* — Rockshana Chowdhury
(74) *Attorney, Agent, or Firm* — Brake Hughes Bellermann LLP

(57) ABSTRACT

An electronic device may include a housing enclosing electronic components, the housing including an aperture on a top portion of the housing, a keyboard within the aperture of the housing, the keyboard comprising multiple keys, and an antenna extending around a subset of the multiple keys.

17 Claims, 10 Drawing Sheets

ANTENNA IN OR BELOW KEYBOARD

PRIORITY CLAIM

This application claims priority to Chinese Patent Application No. 201310625729.3, filed on Nov. 28, 2013, the disclosure of which is hereby incorporated by reference.

TECHNICAL FIELD

This description relates to devices for wireless communication.

BACKGROUND

Mobile devices, such as cellphones or smartphones, may communicate with nearby computing devices, such as via Near Field Communication (NFC) protocols. Portable computing devices, such as laptop or notebook computers, may include a metal housing or chassis that interferes with wireless communication, making communication with the mobile device difficult.

SUMMARY

In an example implementation, an electronic device may include an antenna, such as a Near Field Communication (NFC) antenna, disposed within or below a keyboard. The disposition of the antenna within or below the keyboard may enable the antenna to receive and send signals from and to devices outside the electronic device without the signals suffering interference from a housing of the electronic device.

According to another example implementation, an electronic device may include a housing enclosing electronic components, the housing including an aperture on a top portion of the housing, a keyboard within the aperture of the housing, the keyboard comprising multiple keys, and an antenna extending around a subset of the multiple keys.

According to another example implementation, an electronic device may include a housing enclosing electronic components, the housing including an aperture on a top portion of the housing, a keyboard within the aperture of the housing, the keyboard comprising multiple keys, and an antenna below the keyboard.

According to another example implementation, a method may include installing an antenna onto a keyboard, and securing the keyboard into an aperture of a housing, the housing enclosing electronic components of an electronic device.

According to another example implementation, an electronic device may include means for enclosing electronic components including an aperture on a top portion of the housing, means for receiving keyboard inputs within the aperture of the housing including multiple keys, and means for receiving wireless and/or electromagnetic signals extending around a subset of the multiple keys.

According to another example implementation, an electronic device may include means for enclosing electronic components including an aperture on a top portion of the housing, means for receiving keyboard inputs within the aperture of the housing including multiple keys, and means for receiving wireless and/or electromagnetic signals below the keyboard.

The details of one or more implementations are set forth in the accompanying drawings and the description below. Other features will be apparent from the description and drawings, and from the claims.

DETAILED DESCRIPTION

Figure 1A:
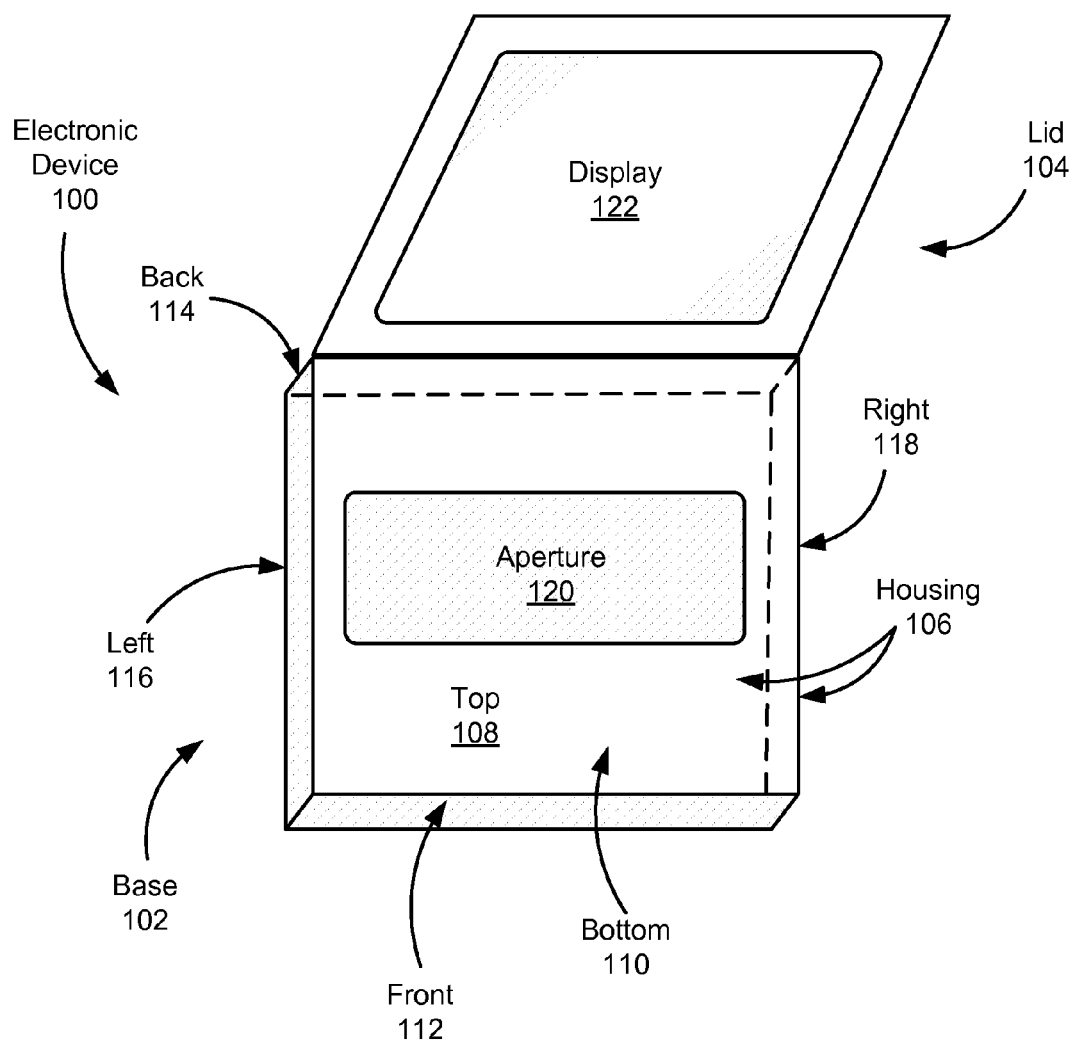
FIG. 1A shows an electronic device, including a housing of a base and a lid according to an example implementation.

FIG. 1A shows an electronic device 100, including a housing 106 of a base 102 and a lid 104 according to an example implementation. The electronic device 100 may include, for example, a laptop or notebook computer.

The electronic device 100 may include the lid 104, which may be rotatably and/or hingedly attached to the base 102. The lid 104 may include a display 122 that displays images to a user.

In the example shown in FIG. 1A, the base 102 includes a housing 106, but FIG. 1A does not show other components which may be included in the base 102. The other components included in the base 102 are described with respect to subsequent figures.

The housing 106 may include six sides. The housing 106 may be hollow and/or recessed within the six sides. The housing 106 may be, for example, a three-dimensional polyhedron such as a rectangular prism or parallelepiped.

The housing 106 may include a top 108 and opposing bottom 110. The top 108 and bottom 110 may be parallel to each other. The top 108 may be considered a "C-case," and/or the entire housing 106 may be considered the C-case. The top 108 of the housing 106 may include and/or define an aperture 120, recess, or hole. The aperture 120 may receive a keyboard (not shown in FIG. 1A) for receiving keystroke inputs. While not shown in FIG. 1A, the top 108 may also include and/or define a second aperture, recess, or hole which receives a tactile input device such as a trackpad or touchpad.

The housing 106 may include four sides perpendicular to the top 108 and bottom 110. The four sides may include a front 112 and opposing back 114. The front 112 and back 114 may be parallel to each other. The four sides may also include a left side 116 and opposing right side 118. The left side 116 and right side 118 may be parallel to each other. The left side 116 and right side 118 may both be adjacent to the front 112 and back 114, and may also be perpendicular to the front 112 and back 114.

In an example implementation, the housing 106 may be made of an electrically conductive material, such as metal including aluminum or steel. The conductive material may make it difficult for electromagnetic radiation, or wireless signals, to pass through the housing 106. In another example implementation, the housing 106 may be made of a non-conductive material, such as plastic.

Figure 1B:
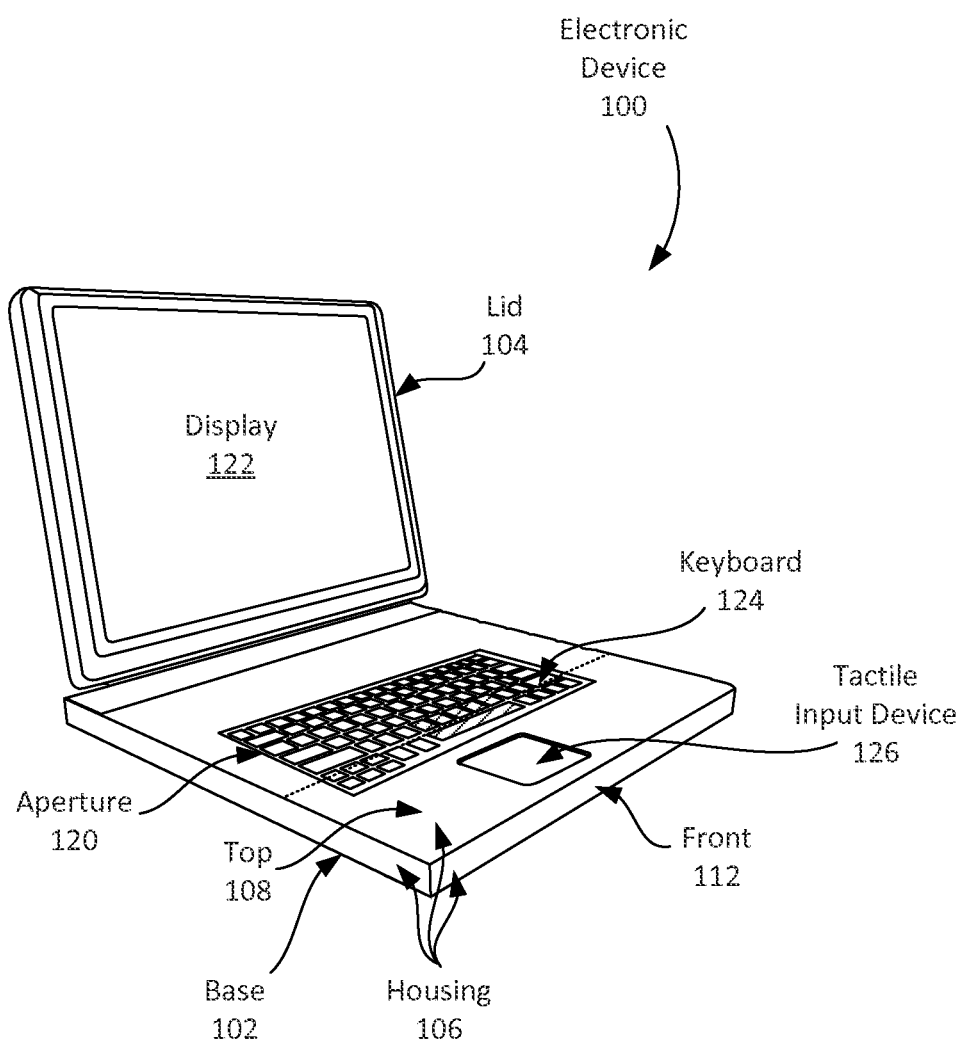
FIG. 1B shows a perspective view of the electronic device of FIG. 1A according to an example implementation.

FIG. 1B shows a perspective view of the electronic device 100 of FIG. 1A according to an example implementation. FIG. 1B shows the keyboard 124 resting and/or disposed within the aperture 120. The keyboard 124 may be secured to the housing 106 by, for example, fasteners (not shown) such as bolts or screws engaging the keyboard 124 and top 108 or side of the housing, or adhesive securing the keyboard 124 to the top 108 of the housing 106 of the base 102.

The keyboard 124 may be parallel to the top 108, and may be generally flush with the top 108 of the housing 106, and/or may extend above or beyond the top 108. The keyboard 124 may include multiple keys. A user may depress the keys within the keyboard 124 to actuate signals indicating keystrokes inputted by the user.

In the example shown in FIG. 1B, the base 102 may also include a tactile input device 126. The tactile input device 126 may include, for example, a trackpad or touchpad. The tactile input device 126 may receive input from a user by the user tapping on and/or swiping the tactile input device 126. The top 108 of the housing 106 may define a second aperture which receives the tactile input device 126.

Figure 1C:
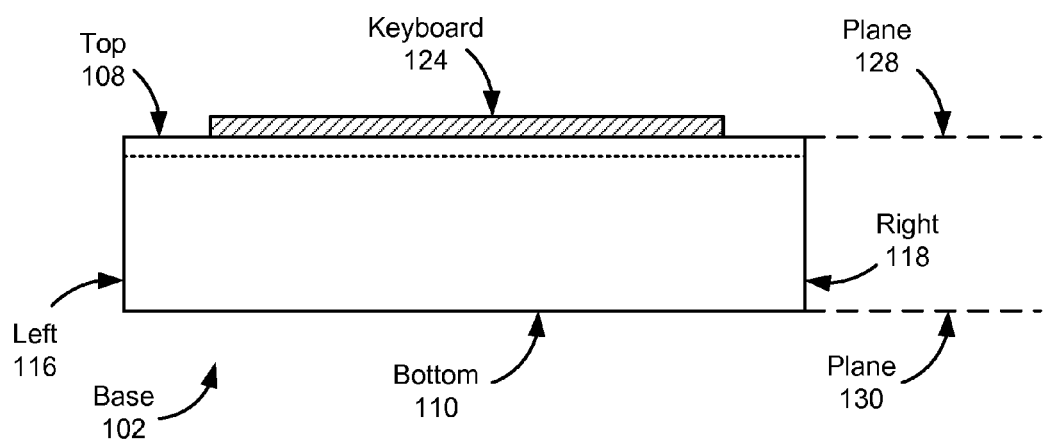
FIG. 1C shows a front view of the base of the electronic device of FIG. 1B according to an example implementation.

FIG. 1C shows a front view of the base 102 of the electronic device 100 of FIG. 1B according to an example implementation. In the example shown in FIG. 1C, the keyboard 124 extends beyond and/or above the top 108 of the base 102 in a vertical direction. In another example, the keyboard 124 may be flush with the top 108. A first imaginary plane 128 may extend along the top 108, and a second imaginary plane 130 may extend along the bottom 110 of the base 102. The keyboard 124 may extend between the left side 116 and right side 118 in a direction parallel to the top 108 and bottom 110, and parallel to both the first and second imaginary planes 128, 130.

Figure 2A:
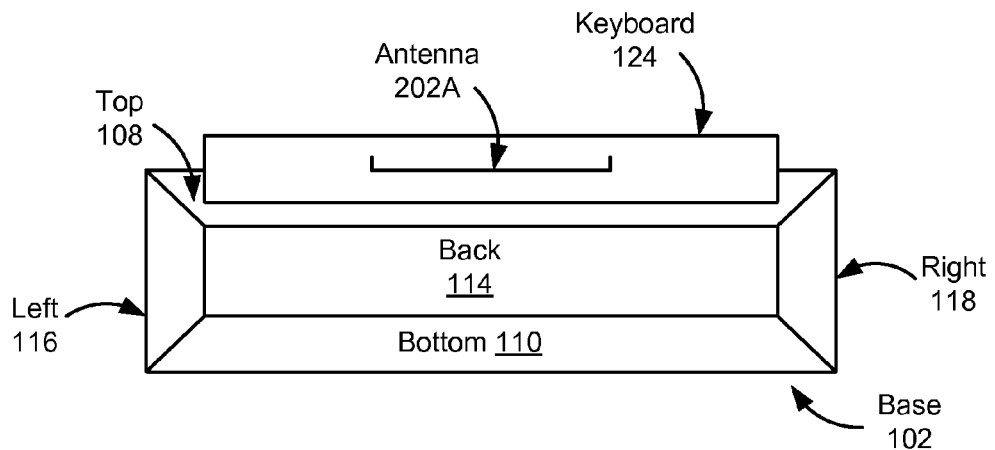
FIG. 2A shows a front cross-sectional view of the base of the electronic device of FIG. 1B according to an example implementation.

FIG. 2A shows a front cross-sectional view of the base 102 of the electronic device 100 of FIG. 1B according to an example implementation. The cross-section may be along the dashed line shown in FIG. 1B. In this example, an antenna 202A extends between and/or around a subset of keys, which may include less than all of the keys, within the keyboard 124, as shown in further detail in FIG. 4. The antenna 202A may also extend around all of the keys in the keyboard 124. The antenna 202A may include an NFC antenna, and/or may be coupled to an antenna processor (not shown in FIG. 2A) such as an NFC antenna processor. The antenna 202A may include a metal wire. The antenna 202A may be wrapped around the subset of keys to form a coil. The antenna 202A may be wrapped around the subset of keys in a rectangular or other shape. The antenna may be wrapped around the subset of keys one or multiple times to form the coil. The antenna's 202A location below the keyboard 124, which is disposed within the aperture 120 (not labeled in FIG. 2A) may allow electromagnetic signals to be transmitted to and from the antenna 202A with minimal interference from the housing 106 (not labeled in FIG. 2A).

The antenna 202A may extend between multiple keys within the keyboard 124, and/or may extend around multiple keys, such as a subset of the keys which is less than all of the keys in the keyboard. In an example implementation, the subset of keys around which the antenna 202A extends may form a rectangular shape, and the antenna 202A may be rectangular. The antenna 202A may extend around portions of the keys that are above the top 108 and visible to the user, rendering the antenna 202A visible to the user, or may extend around portions of the keys that are below the top and not visible to the user, hiding the keys from the user. In an example in which the antenna 202A extends around portions of the keys that are above the top 108 and visible to the user, the antenna may be painted or otherwise colored a same color as the keys so that they are less noticeable to the user.

Figure 2B:
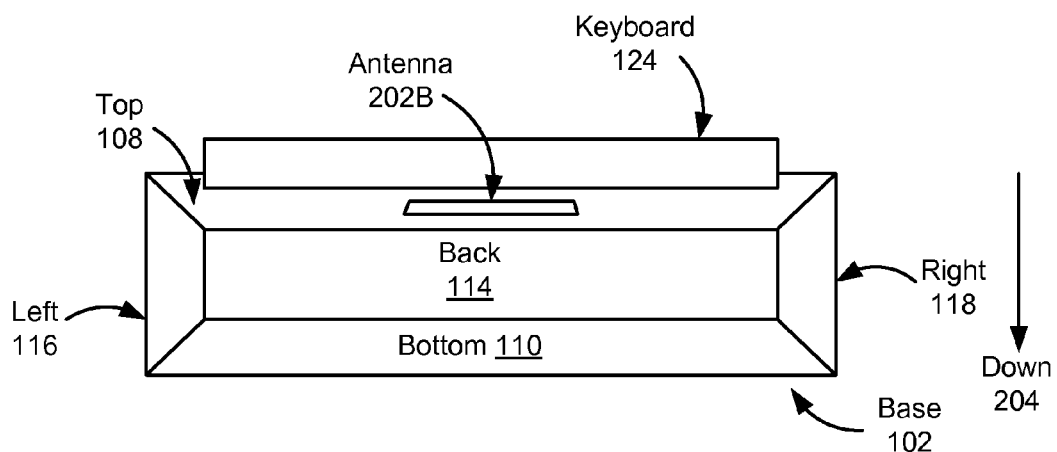
FIG. 2B shows a front cross-sectional view of the base of the electronic device of FIG. 1B according to another example implementation.

FIG. 2B shows a front cross-sectional view of the base 102 of the electronic device 100 of FIG. 1B according to another example implementation. The cross-section may be along the dashed line shown in FIG. 1B. A down direction 204 may be perpendicular to both the first imaginary plane 128 and second imaginary plane 130 shown in FIG. 1C, and may extend from the first imaginary plane 128 to the second imaginary plane 130. As used herein, and first object may be considered "below," or further down than, a second object, if the first object is closer to the bottom 110 than the second object, and a first object may be considered "above," or further up than, a second object, if the first object is farther from the bottom 110 than the second object.

In the example shown in FIG. 2B, base 102 includes an antenna 202B below the keyboard 124. The antenna 202B may include an NFC antenna, and/or may be coupled to an antenna processor (not shown in FIG. 2B) such as an NFC antenna processor. The antenna 202B may include a metal wire wrapped around in a rectangular or other shape, such as a circular or oval shape, multiple times to form a coil. The antenna's 202B location below the keyboard 124 may allow electromagnetic signals to be transmitted to and from the antenna 202B with minimal interference from the housing (not labeled in FIG. 2B).

Figure 3A:
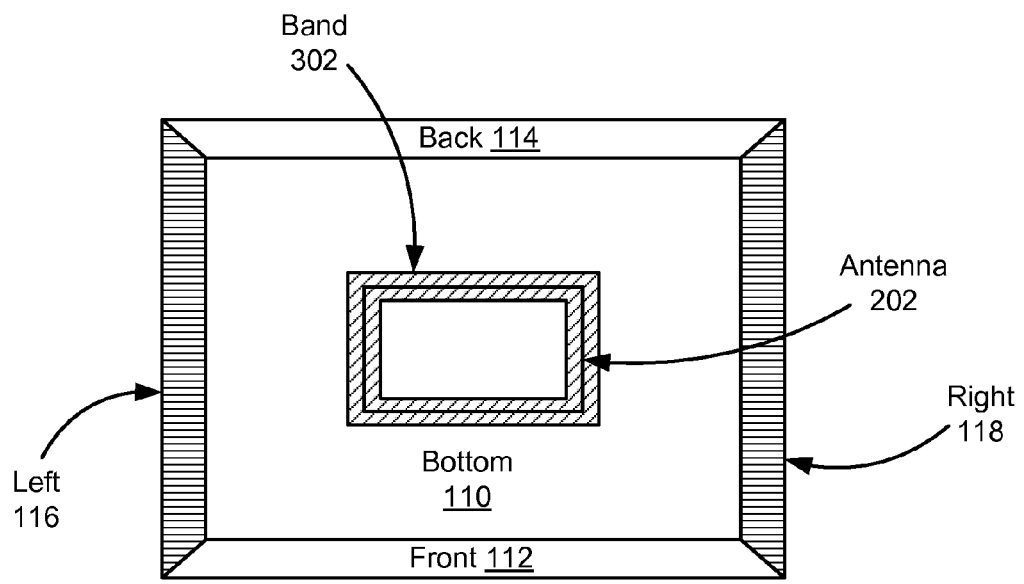
FIG. 3A shows a top cross-sectional view of the base shown in FIG. 2B according to an example implementation.

FIG. 3A shows a top cross-sectional view of the base 102 shown in either FIG. 2A or FIG. 2B according to an example implementation. The cross-section may be along the dashed line in the base 102 shown in FIG. 1C. In this example, the base 102 may include a magnetic band 302 below the antenna 202. The antenna 202 may include either the antenna 202A shown and described with respect to FIG. 2A or the antenna 202B shown and described with respect to FIG. 2B. The magnetic band 302 may be made of a magnetic material, such as ferrite. The magnetic band 302 may have a size and shape corresponding to the antenna 202, such as rectangular. The magnetic band 302 may be wider than the antenna 202, so that the entire antenna 202 is superposed onto the magnetic band 302 in a direction parallel to the down direction 204 shown and described with respect to FIG. 2B. In an example in which the antenna 202 is included in the keyboard 124 (not shown in FIG. 3A), and extends between and/or wraps around the keys, the band 302 may also be included in the keyboard 124, just below the antenna 202, and extend between and/or wrap around the keys. The magnetic band 302 may redirect and/or enhance magnetic flux generated by the antenna 202 out of the housing 106 (not labeled in FIG. 3A) through the aperture 120 (not labeled in FIG. 3A), and or may redirect magnetic flux which was not absorbed by the antenna 202 back toward the antenna 202.

Figure 3B:
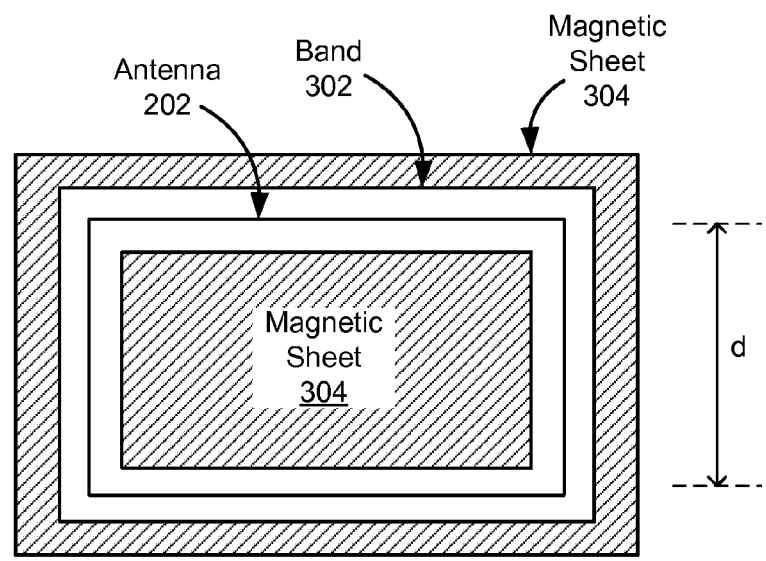
FIG. 3B shows relative positionings of an antenna, band, and magnetic sheet according to an example implementation.

FIG. 3B shows relative positionings of an antenna 202, the band 302, and a magnetic sheet 304 according to an example implementation. The antenna 202 may be rectangular. A distance d between opposite portions of the antenna 202 may be between twenty and forty-five millimeters in metric units, or between three and six inches or four and five inches in English units according to example implementations.

The magnetic band 302 may have a size and shape corresponding to the antenna 202, such as rectangular. The magnetic band 302 may be wider than the antenna 202, so that the entire antenna 202 is superposed onto the magnetic band 302 in a direction parallel to the down direction 204 shown and described with respect to FIG. 2B.

The magnetic sheet 304 may be rectangular, or any non-recessed shape with sufficient area that the entire antenna 202 is superposed onto a perimeter portion of the magnetic sheet 304 in a direction parallel to the down direction 204 shown and described with respect to FIG. 2B, and the entire magnetic band 302 is superposed onto the perimeter portion of the magnetic sheet 304 in a direction parallel to the down direction 204 shown and described with respect to FIG. 2B. The band 302 and/or magnetic sheet 304 may be made of a magnetic material, such as ferrite. The magnetic sheet 304 may supplement the band 302 by further redirecting magnetic flux. In an example in which the antenna 202 is located below the keyboard 124, and/or below an elastic sheet 502 (not shown in FIG. 3B) and electrical grid 504 (not shown in FIG. 3B), the electronic device 100 (not labeled in FIG. 5) may not include the band 302, and the magnetic sheet 304 may perform all the redirection of magnetic flux.

Figure 4:
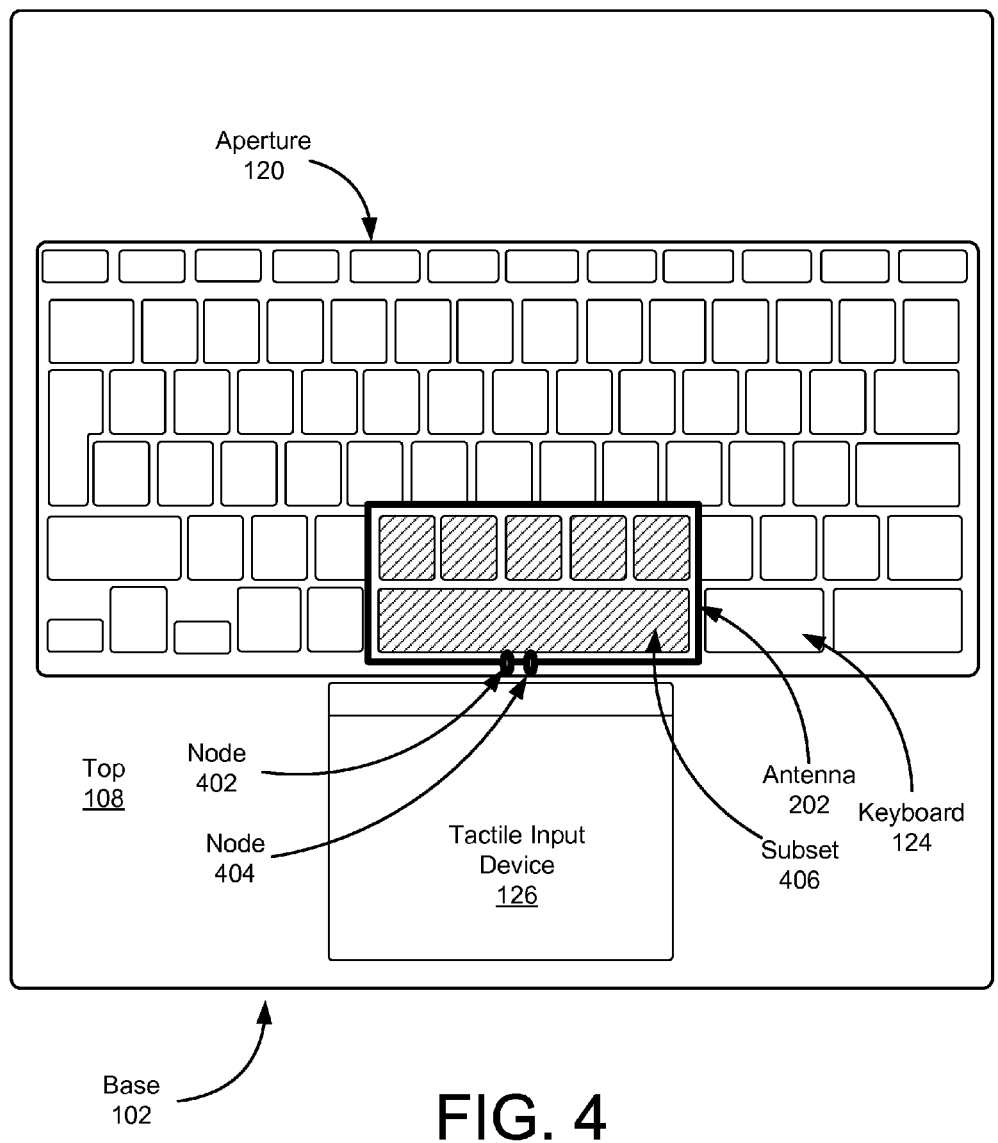
FIG. 4 shows a top view of the base shown in FIG. 2A according to an example implementation.

FIG. 4 shows a top view of the base 102 shown in FIG. 2A according to an example implementation. In this example, the antenna 202 extends between multiple keys within the keyboard 124, and/or between a subset 406 of keys within the keyboard 124. The subset 406 of keys around which the antenna 202 extends is shown with shading in FIG. 4. In an example implementation, and arrangement and/or shape of the keys may be modified from a standard arrangement and/or shape so that the subset 406 forms a rectangular shape. The keyboard 124 may include gaps between the keys, as shown in FIG. 4. In another example embodiment, the keyboard 124 may not include spacing or gaps between the keys, and the keys may slide against each other when depressed.

In the example shown in FIG. 4, the base 102 may include a first node 402 coupled to the antenna 202 and a second node 404 coupled to the antenna 202. The first and second nodes 402, 404 may be coupled to opposite ends of the antenna 202. The first and second nodes 402, 404 may be coupled to an antenna processor (not shown in FIG. 4), such as an NFC processor. The antenna processor may be included in the base 102, and may be below the keyboard 124, antenna 202, magnetic band 302 (not shown in FIG. 4), and/or magnetic sheet 304 (not shown in FIG. 4). The first and second nodes 402, 404 may route electrical signals received by the antenna to the antenna processor. The first and second nodes 402, 404 may also route electrical signals generated by the antenna processor to the antenna 202 for generation of electromagnetic and/or wireless signals.

Figure 5:
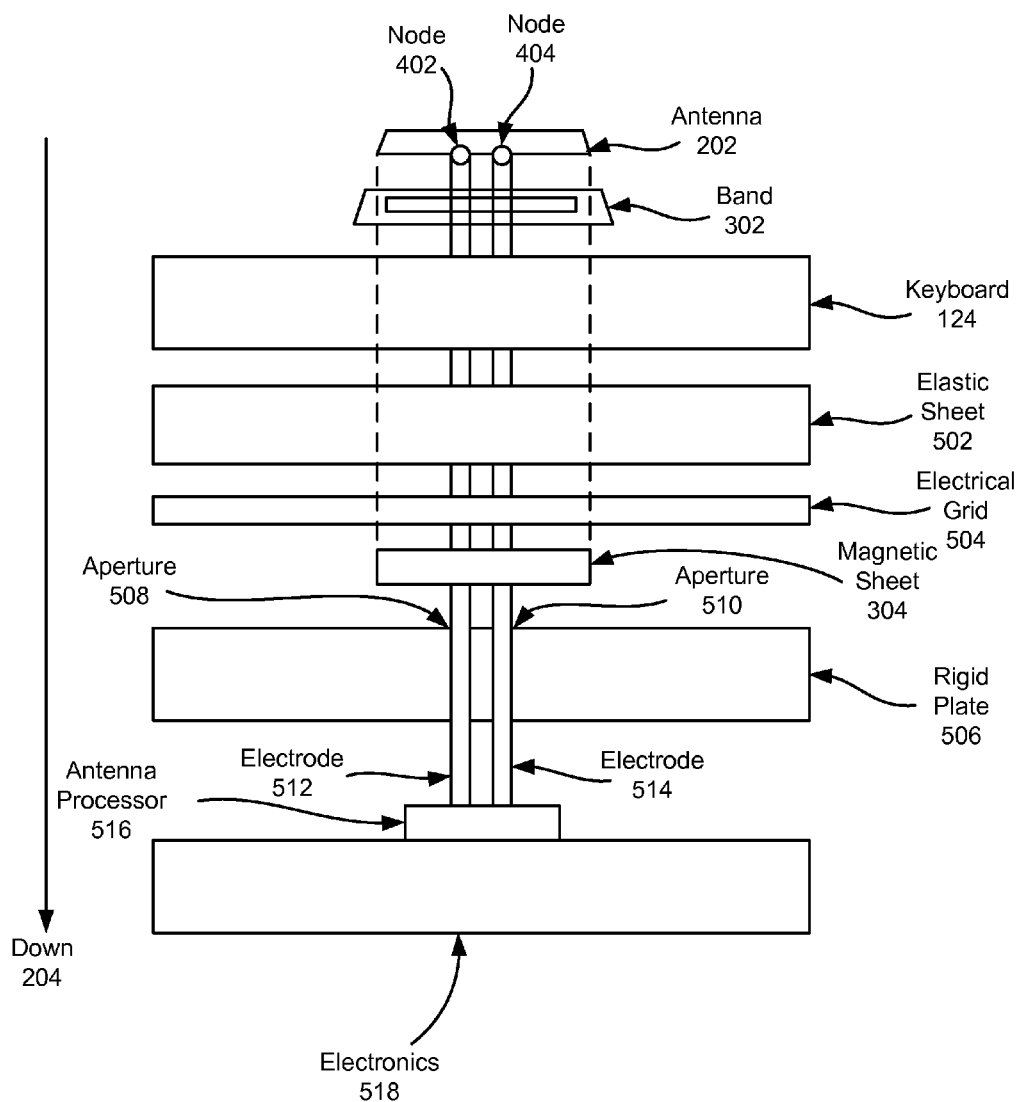
FIG. 5 shows components of the base according to an example implementation.

FIG. 5 shows components of the base 102 (not shown in FIG. 5) according to an example implementation. While FIG. 5 shows the antenna 202 and band 302 above the keyboard 124 for illustrative purposes, the antenna 202 and/or band 302 may be included in the keyboard 124, such as between and/or around multiple keys within the keyboard 124 as in the examples shown and described with respect to FIGS. 2A and 4, or below the keyboard 124 as in the examples shown and described with respect to FIGS. 2B and 3A.

The base 102 may also include the first and second nodes 402, 404 coupled to the antenna 202 and to electronic components such as an antenna processor 516. The base 102 may also include the band 302. The band 302 may be disposed below the antenna 202, and may be within the keyboard 124 such as between or around multiple keys within the keyboard 124, or below the keyboard 124. The keyboard 124 may be enclosed by the top 108 (not shown in FIG. 5) of the housing 106.

The base 102 may include an elastic sheet 502 below the keyboard 124. In an example in which the antenna 202 and/or band 302 are below the keyboard 124, the antenna 202 and/or band 302 may be disposed between the keyboard 124 and the elastic sheet 502. The elastic sheet 502 may include, for example, rubber and/or rubber mylar. The elastic sheet 502 may support the keys, preventing the keys from falling down into the base 102.

The base 102 may also include an electrical grid 504 below the elastic sheet 502. The electrical grid 504 may include wires to detect depressions of keys and/or keystrokes within the keyboard 124 based on changes in resistance and/or capacitance, and in response to the detected depressions, send signals to electronic components of the base 102 indicating the depressions and/or keystrokes. In an example implementation, the elastic sheet 502 and electrical grid 504 may be considered components of the keyboard 124.

The base 102 may include the magnetic sheet 304 below the elastic sheet 502 and/or electrical grid. The magnetic sheet 304 may be located within the base 102 so that the entire antenna 202 is superposed onto the magnetic sheet 304 and the entire magnetic band 302 is superposed onto the magnetic sheet 302. The magnetic sheet 304 may supplement the band 302 by further redirecting magnetic flux. In an example in which the antenna 202 is located below the keyboard 124, and/or the elastic sheet 502 and electrical grid 504, the electronic device 100 (not labeled in FIG. 5) may not include the band 302, and the magnetic sheet 304 may perform all the redirection of magnetic flux.

The base 102 may include a rigid plate 506 below the magnetic sheet 304. The rigid plate 506 may include a rigid material, such as metal or plastic. The rigid plate 506 may operate in conjunction with the elastic sheet 502, and may provide additional support to the keys included in the keyboard 124, preventing the keys from falling down into the base 102.

The rigid plate 506 may include and/or define apertures 508, 510 and/or holes. The apertures 508, 510 may allow electrodes 512, 514, which may be coupled to both the nodes 402, 404 and the antenna processor 516, to extend through the rigid plate 506.

The base 102 may also include the antenna processor 516 below the rigid plate 506 and/or magnetic sheet 304. The antenna processor 516 may be coupled to the nodes 402, 404 of the antenna 202 via the electrodes 514. The antenna processor 516 may receive, process, generate, and transmit electromagnetic signals, and may provide and/or receive data from other electronics 518 included in the base 102. The electronics 518 may be secured to the bottom 110 of the housing 106 and may include, for example, a motherboard of the electronic device 100. The electronics 518 may include, for example, at least one processor configured to execute instructions, and at least one memory device configured to store instructions for execution by the at least one processor and data.

Figure 6:
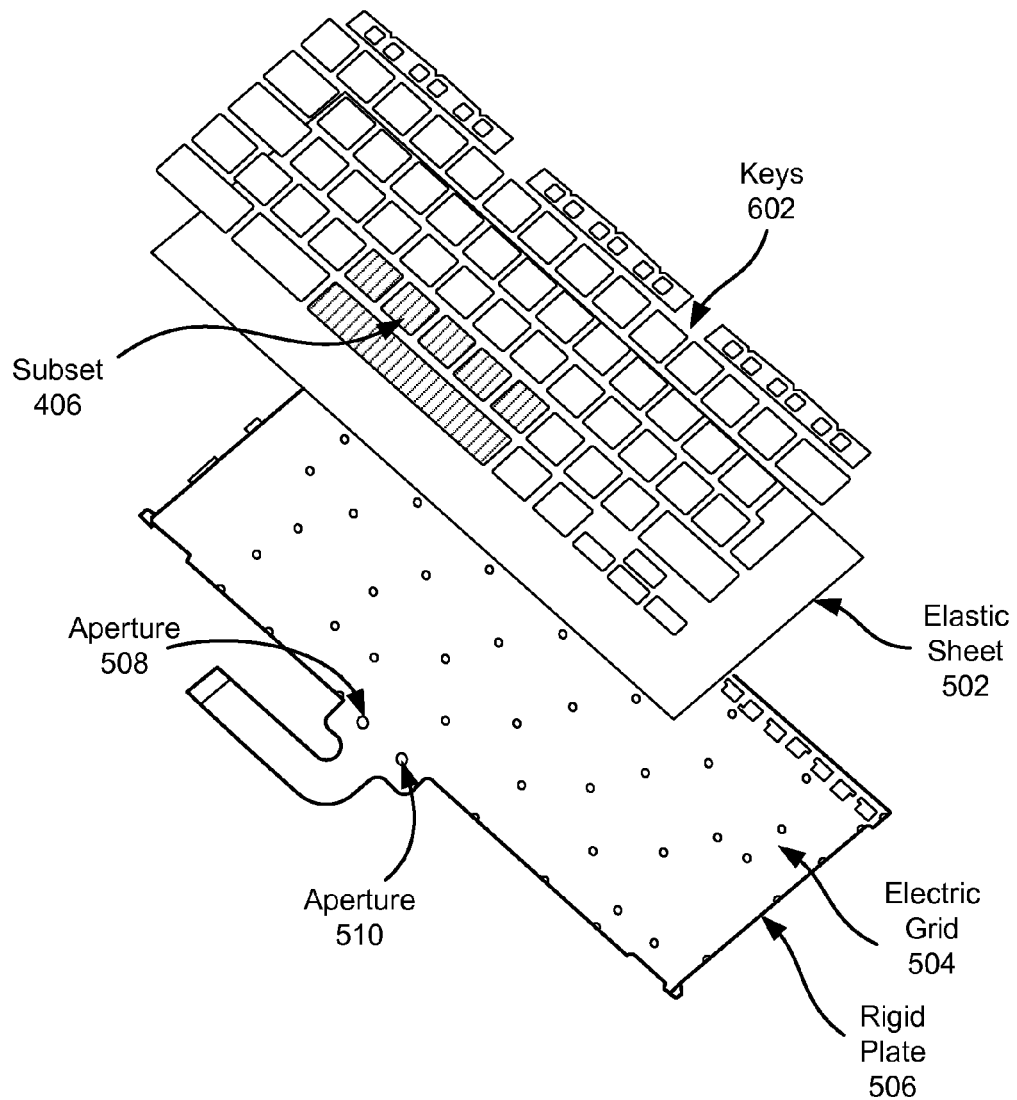
FIG. 6 shows components of the base shown in either FIG. 2A or 2B according to another example implementation.

FIG. 6 shows components of the base 102 shown in either FIG. 2A or 2B according to another example implementation. The components shown in FIG. 6 may, for example, be components of the keyboard 124. The keyboard 124 may include keys 602. The keys 602 may include alphanumeric keys, directional keys, functional keys, and control keys, as non-limiting examples. The keys 602 may also include the subset 406 of keys around which the antenna is wrapped in the example shown and described with respect to FIGS. 2A and 4. The keys 602 may be arranged and/or shaped in a non-standard configuration so that the subset 206 of keys forms a rectangle, according to an example implementation.

The keyboard 124 may also include the elastic sheet 502 below the keys 602. The elastic sheet 502 may allow the keys 602 to be depressed, and the elastic sheet 502 may be biased to bring the keys 602 back to their original position before being depressed.

The keyboard 124 may also include the electrical grid 504 attached to the rigid plate 506. The electrical grid 504 may determine which keys were pressed, and send signals to electronic components included in the base 102 (not shown in FIG. 6) indicating which keys 602 were pressed. The rigid plate 506 may provide additional support to the keys 602. The rigid plate 506 may also include the apertures 508, 510 through which the electrodes 512, 514 (shown in FIG. 5) extend.

Figure 7:
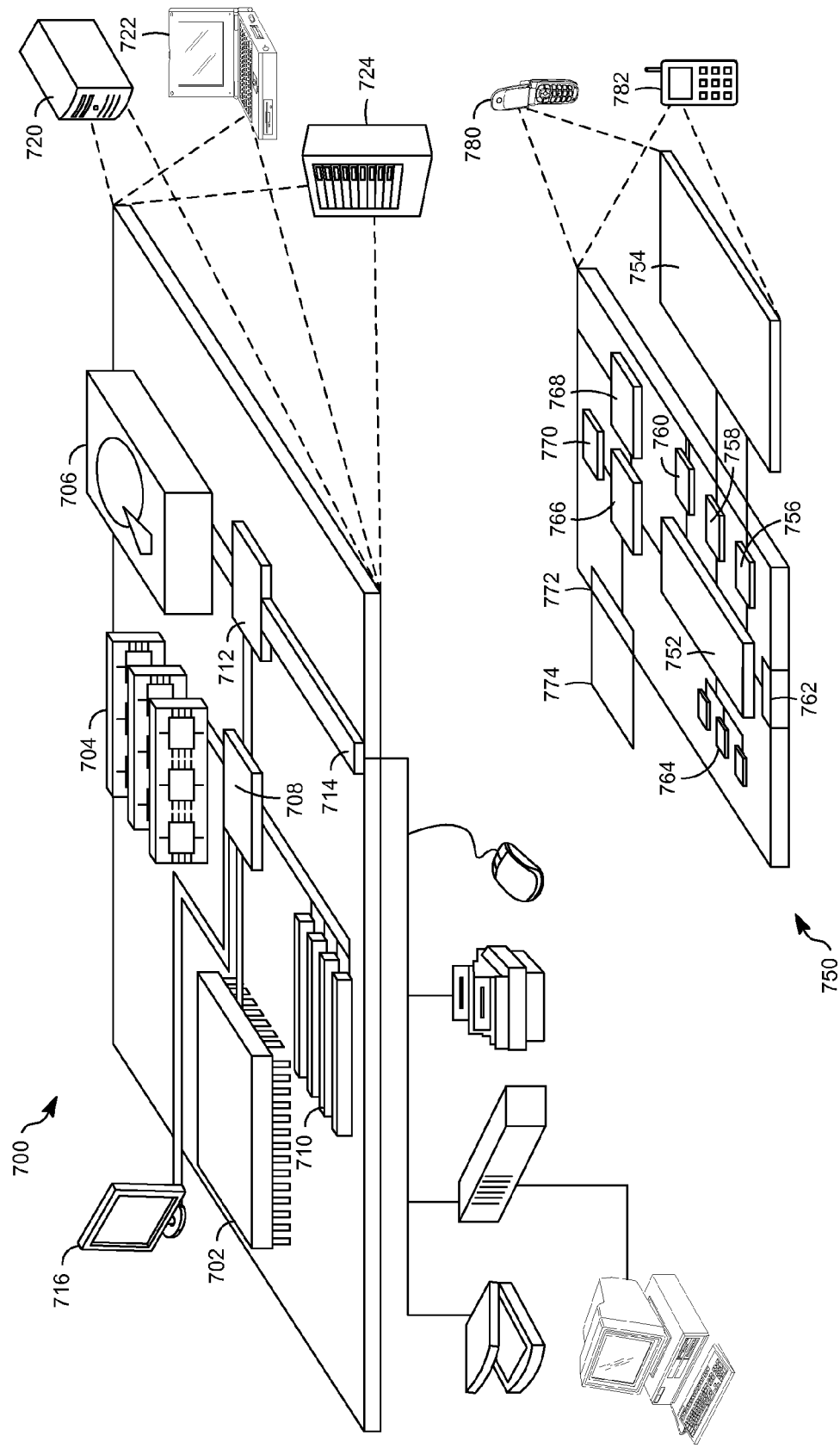
FIG. 7 shows an example of a generic computer device 700 and a generic mobile computer device 750, which may be used with the techniques described here.

FIG. 7 shows an example of a generic computer device 700 and a generic mobile computer device 750, which may be used with the techniques described here. Computing device 700 may be an example of the electronic device 100 described above, and is intended to represent various forms of digital computers, such as laptops, desktops, workstations, personal digital assistants, servers, blade servers, mainframes, and other appropriate computers. The computing device 750 may include any combination of components described above with respect to the electronic device 100, as well as any combination of components described below. Computing device 750 is intended to represent various forms of mobile devices, such as personal digital assistants, cellular telephones, smart phones, and other similar computing devices. The computing device 750 may include, for example, a Near Field Communication (NFC) interface configured to communicate with the antenna 200 and/or antenna processor 516 described above. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Figure 8:
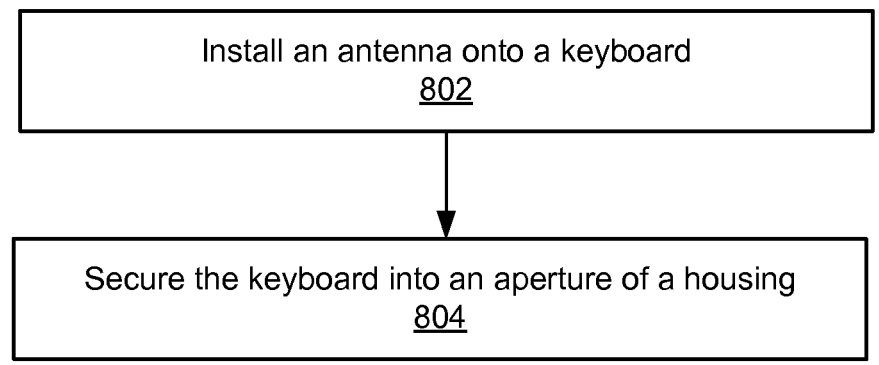
FIG. 8 is a flowchart of a method according to an example implementation.

FIG. 8 is a flowchart of a method according to an example implementation. According to this example, the method may include installing an antenna 202A, 202B onto a keyboard 124 (802). The method may also include securing the keyboard 124 into an aperture 120 of a housing 106 (804). The housing 106 may enclose electronic components 516 of an electronic device 100.

In an example embodiment, the installing the antenna 202A, 202B onto the keyboard 124 may include wrapping the antenna 202A around a subset of keys 406 within the keyboard 124.

In an example embodiment, the installing the antenna 202A, 202B onto the keyboard 124 may include installing the antenna 202B onto a bottom side of the keyboard 124. The securing the keyboard 124 may include securing the keyboard 124 into the aperture 124 of the housing 106, the bottom side of the keyboard 124 facing an interior of the housing.

A number of embodiments have been described. Nevertheless, it will be understood that various modifications may be made without departing from the spirit and scope of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An electronic device comprising:
   a housing enclosing electronic components, the housing including an aperture on a top portion of the housing;
   a keyboard within the aperture of the housing, the keyboard comprising multiple keys;
   an antenna extending around a subset of the multiple keys;
   a magnetic band below the antenna;
   a magnetic sheet below the magnetic band, the magnetic sheet including a perimeter portion which is superposed by the antenna;
   an elastic sheet interposed between the keyboard and the magnetic sheet; and
   an electrical grid interposed between the elastic sheet and the magnetic sheet, the electrical grid being configured to indicate to the electronic components which of the multiple keys comprised by the keyboard has been depressed.

2. The electronic device of claim 1, wherein the housing includes an electrically conductive material.

3. The electronic device of claim 1, wherein the housing includes metal.

4. The electronic device of claim 1, wherein the multiple keys comprised by the keyboard are arranged so that the subset of keys defines a rectangle and the antenna extends around the subset of keys in a rectangular shape.

5. The electronic device of claim 1, wherein the antenna is rectangular in a plane parallel to the top portion of the housing.

6. The electronic device of claim 1, wherein a distance between opposite portions of the antenna is between three and six inches.

7. The electronic device of claim 1, wherein the magnetic band extends around the subset of keys.

8. The electronic device of claim 7, wherein:
an imaginary plane extends along the top portion of the housing; and
all of the antenna extending around the subset of the multiple keys projects onto the magnetic band in a direction perpendicular to the imaginary plane.

9. The electronic device of claim 1, further comprising:
electronic components secured to a bottom of the housing; and
a rigid plate interposed between the elastic sheet and the electronic components.

10. The electronic device of claim 1, wherein the magnetic band comprises a ferrite band.

11. The electronic device of claim 1, further comprising an antenna processor coupled to the antenna, the antenna processor being located below the antenna.

12. The electronic device of claim 1, further comprising a near field communication (NFC) antenna processor coupled to the antenna, the NFC antenna processor being located below the antenna.

13. The electronic device of claim 1, further comprising at least one microprocessor and at least one memory device, the at least one microprocessor being coupled to the antenna and the at least one memory device.

14. An electronic device comprising:
a housing enclosing electronic components, the housing including an aperture on a top portion of the housing;
a keyboard within the aperture of the housing, the keyboard comprising multiple keys;
an antenna below the keyboard;
a magnetic band below the antenna;
a magnetic sheet below the magnetic band, the magnetic sheet including a perimeter portion which is superposed by the antenna;
an elastic sheet interposed between the keyboard and the magnetic sheet; and
an electrical grid interposed between the elastic sheet and the magnetic sheet, the electrical grid being configured to indicate to the electronic components which of the multiple keys comprised by the keyboard has been depressed.

15. The electronic device of claim 14, wherein the housing includes a conductive material.

16. The electronic device of claim 14, wherein the housing includes metal.

17. A method of assembling an electronic device, the method comprising:
wrapping an antenna around a subset of keys within a keyboard;
securing the keyboard into an aperture of a housing, the housing enclosing electronic components of an electronic device;
installing a magnetic band below the antenna;
installing a magnetic sheet below the magnetic band, the magnetic sheet including a perimeter portion which is superposed by the antenna;
installing an elastic sheet interposed between the keyboard and the magnetic sheet; and
installing an electrical grid interposed between the elastic sheet and the magnetic sheet, the electrical grid being configured to indicate to the electronic components which of multiple keys comprised by the keyboard has been depressed.

\* \* \* \* \*